United States Patent
Chappey et al.

(10) Patent No.: US 9,331,353 B2
(45) Date of Patent: May 3, 2016

(54) PROTON-CONDUCTING COMPOSITE MEMBRANE FOR FUEL CELLS

(75) Inventors: Corinne Chappey, Bosc Roger sur Buchy (FR); Sema Karademir, Bois Guillaume (FR); Quang Trong Nguyen, Le Havre (FR); Dominique Langevin, Critot (FR); Stephane Marais, Malaunay (FR); Regis Mercier, Irigny (FR); Mathieu Martinez, Grenoble (FR); Cristina Iojoiu, Vourey (FR); Jean-Ives Sanchez, Saint-Ismier (FR)

(73) Assignees: Universite De Rouen, Mont-Saint-Aigan (FR); Institut Polytechnique De Grenoble, Grenoble (FR); Centre National De La Recherche Scientifique—CNRS, Paris (FR)

( * ) Notice: Subject to any disclaimer, the term of this patent is extended or adjusted under 35 U.S.C. 154(b) by 352 days.

(21) Appl. No.: 13/988,851

(22) PCT Filed: Nov. 29, 2011

(86) PCT No.: PCT/FR2011/052805
§ 371 (c)(1),
(2), (4) Date: Sep. 3, 2013

(87) PCT Pub. No.: WO2012/072940
PCT Pub. Date: Jun. 7, 2012

(65) Prior Publication Data
US 2014/0199613 A1    Jul. 17, 2014

(30) Foreign Application Priority Data
Nov. 29, 2010  (FR) ..................... 10 59866

(51) Int. Cl.
| H01M 8/10 | (2006.01) |
| C08G 73/10 | (2006.01) |
| C08J 5/22 | (2006.01) |
| H01B 1/12 | (2006.01) |
| H01M 8/02 | (2016.01) |

(52) U.S. Cl.
CPC ............ *H01M 8/1067* (2013.01); *C08G 73/10* (2013.01); *C08G 73/1039* (2013.01); *C08G 73/1082* (2013.01); *C08J 5/22* (2013.01); *H01B 1/122* (2013.01); *H01M 8/0291* (2013.01); *H01M 8/1018* (2013.01); *C08J 2379/08* (2013.01); *Y02E 60/522* (2013.01); *Y02P 70/56* (2015.11)

(58) Field of Classification Search
CPC ............ H01M 8/1067; H01M 8/0291; H01M 8/1018; C08G 73/10; C08G 73/1039; C08G 73/1082; C08J 5/22; C08J 2379/08; H01B 1/122
USPC ....................... 521/27; 429/492; 427/115, 535
See application file for complete search history.

(56) References Cited

U.S. PATENT DOCUMENTS

| 4,963,303 A | * | 10/1990 | Anderson | ............... 264/41 |
| 6,083,297 A | * | 7/2000 | Valus et al. | ............... 95/44 |
| 2006/0249018 A1 | * | 11/2006 | Wang et al. | ............... 95/45 |
| 2010/0288701 A1 | * | 11/2010 | Zhou et al. | ............... 210/641 |

FOREIGN PATENT DOCUMENTS

| CN | 101 665 580 | | 3/2010 |
| CN | 101665580 A | * | 3/2010 |
| EP | 1 515 346 | | 3/2005 |
| EP | 1515346 A1 | * | 3/2005 |
| JP | 2008 034212 | | 2/2008 |
| JP | 2008034212 A | * | 2/2008 |
| WO | WO 2008/009814 | | 1/2008 |

OTHER PUBLICATIONS

International Search Report dated Apr. 5, 2012 for Application No. PCT/FR2011/052805.
International Preliminary Report on Patentability dated Jun. 4, 2013 for Application No. PCT/FR2011/052805.
Bebin, P., et al., "Nafion®/clay-SO3H membrane for proton exchange membrane fuel cell application", Journal of Membrane Science, vol. 278, iss. 1-2, 2006, pp. 35-42.
Dhara, M., et al., "Fluorinated high-performance polymers: Poly(arylene ether)s and aromatic polyimides containing trifluoromethyl groups", Progress in Polymer Science, vol. 35, iss. 8, Aug. 2010, pp. 1022-1077.
Ericson, B.L., et al., "Sulfonation of polymer surfaces—I. Improving adhesion of polypropylene and polystyrene to epoxy adhesives via gas phase sulfonation", Journal of Adhesion Science and Technology, vol. 11, No. 10, 1997, pp. 1249-1267.
Iojoiu, C., et al., "Ion transport in CLIP: Investigation through conductivity and NMR measurements", Electrochimica Acta, vol. 53, Issue 4, Dec. 31, 2007, pp. 1395-1403.
Iojoiu, C., et al., "PILs-based Nafion membranes: a route to high-temperature PEFMCs dedicated to electric and hybrid vehicles", Polymers for Advanced Technologies, vol. 19, Issue 10, Oct. 2008, pp. 1406-1414.

(Continued)

*Primary Examiner* — Michael M Bernshteyn
(74) *Attorney, Agent, or Firm* — Frost Brown Todd LLC

(57) ABSTRACT

The present invention relates to a membrane that includes a porous polymer material made of a polyimide with interconnected macropores and impregnated with protic ionic liquid conductors (CLIP), as well as to the method for manufacturing same and to the uses thereof. The membranes of the invention fulfill the need for membranes including CLIPs, which have good proton-conducting properties as well as good physical properties, in particular high thermal and mechanical stability, in addition to a wide range of electrochemical stability.

18 Claims, 6 Drawing Sheets

(56) References Cited

OTHER PUBLICATIONS

Lee, S. Y. et al., "Fabrication of protic ionic liquid/sulfonated polyimide composite membranes for non-humidified fuel cells", Journal of Power Sources, Elsevier SA, CH, vol. 195, No. 18, Sep. 15, 2010, pp. 5909-5914.

Martinez, M. et al., "Proton-conducting ionic liquid-based Proton Exchange Membrane Fuel Cell membranes: The key role on ionomer-ionic liquid interaction", Journal of Power Sources, Elsevier SA, CH, vol. 195, No. 8, Sep. 15, 2010, pp. 5829-5839.

Munakata et al., "Three-dimensionally ordered macroporous polyimide composite with controlled pore size for direct methanol fuel cells", Journal of Power Sources, Elsevier SA, CH, vol. 178, No. 2, Mar. 3, 2008, p. 596-602.

Sasaki, S., et al., "Synthesis of Fluorinated Polyimides", *Polymidies:fundamental and applications,* Gosh, M. et al. Eds., Marcel Dekker Inc. N.Y., Chapter 4, pp. 71-119 (1996).

Sekhon, S.S. et al., "Morphology Studies of High Temperature Proton Conducting Membranes Containing Hydrophilic/Hydrophobic Ionic Liquids", Macromolecules, vol. 42, No. 6, Mar. 24, 2009, pp. 2054-2062.

English Machine Translation of Chinese Patent No. CN 101 665 580.

English Machine Translation of European Patent No. WO 2008/009814.

\* cited by examiner

A)

B)

PROTON-CONDUCTING COMPOSITE MEMBRANE FOR FUEL CELLS

TECHNICAL FIELD OF THE INVENTION

The present invention relates to new, proton-conducting composite membranes for fuel cells.

A fuel cell is an electrochemical conversion system that allows the chemical energy contained within a fuel—for example, hydrogen or a source of hydrogen—to be converted into electrical energy and, secondarily, into heat. At the present time, the two principal fuel cell technologies are solid oxide fuel cells (SOFC) and proton exchange membrane fuel cells (PEMFC).

PEMFCs operate generally at temperatures of between 50° C. and 80° C., which is low by comparison with the SOFCs, which operate generally at temperatures greater than 800° C. Their low operating temperature is often considered to be an advantage: PEMFCs are easier to manufacture and to use than are SOFCs. Moreover, PEMFCs exhibit high power density and rapid startup. For these reasons, these cells are particularly suitable for applications in the automobile. However, the low operating temperature of PEMFCs is also a problem. In a PEMFC, the electrolyte separating the anode from the cathode consists of a hydrated polymer whose function is to guide the protons $H^+$ from one electrode to the other. It is the movement associated with the displacement of these protons which is at the origin of the electrical current. If the temperature rises above 80° C., the membrane of the PEMFC dries out and the proton conductivity goes down. Heat management of the cell within vehicles is therefore problematic.

At the present time, the challenge to researchers is to design the PEMFCs which are able to operate at temperatures greater than 100° C. At these temperatures, the operation of the cell presents numerous advantages, including the following:
  the electrochemical kinetics of the reactions at the electrodes increases;
  the management of water within the cell is made easier, owing to the increase of the temperature gradient between the cell and the cooling liquid;
  the heat produced can be exploited;
  the cell is less sensitive overall to poisoning by carbon monoxide.

PRIOR ART

Proposed in the literature has been the manufacture of PEMFCs in which an ionic liquid plays the part of the electrolyte. Ionic liquids are salts which have a melting temperature of lower than 100° C., and often in fact lower than the ambient temperature. Ionic liquids are highly stable; they have a vapor pressure of virtually zero and are not flammable. Some ionic liquids are able to fulfill the function of proton conductors: these are protic ionic liquids, often denoted by the name CLIP (for the French Conducteurs Liquides Ioniques Protiques, cognate with PCIL—proton-conducting ionic liquids). Research into these PCILs has already been published (see, for example, "Ion transport in CLIP: Investigation through conductivity and NMR measurements", C. Iojoiu, P. Judeinstein, and J.-Y. Sanchez, *Electrochimica acta* 53 (2007) 1395-1403). PCILs can be used as electrolyte in anhydrous PEMFCs which operate at high temperature, i.e., typically between 100° C. and 160° C. (see, for example, international patent application WO 2008/009814). By definition, however, PCILs are liquid at the temperature at which such PEMFCs operate. They must therefore be integrated into a membrane which will provide the necessary mechanical strength to the electrolyte.

Different types of membranes comprising PCILs have been disclosed. They are:
  a) either dense membranes composed of a polymer/PCIL mixture, obtained by conventional techniques of casting and evaporation of the solvent ("solvent casting method"),
  b) or commercial, dense or porous, membranes impregnated with PCIL.

The article by Lee et al. (*Journal of Power Sources*, 195 (2010) 5909-5914) presents one example of manufacture of dense, composite protic ionic liquid/sulfonated polyimide membranes, obtained by casting and evaporation of the solvent.

Results relating to the impregnation of Nafion® membranes with PCILs have already been published (see "PILs-based Nafion membranes: a route to high-temperature PEFMCs dedicated to electric and hybrid vehicles", C. Iojoiu, M. Martinez, M. Hanna, Y. Molmeret, L. Cointeaux, J.-C. Leprêtre, N. El Kissi, J. Guindet, P. Judeinstein, and J.-Y. Sanchez, *Polym. Adv. Technol.* (2008) 19 (10), 1406-1414). Nafion® is a dense perfluorosulfonic/tetrafluorosulfonic acid copolymer sold by DuPont de Nemours. The membranes obtained according to this prior art have good conductivity (of the order of 20 mS/cm at 130° C.), but inadequate mechanical properties: their Young's modulus is less than 1 MPa at this temperature.

Patent application JP 2008034212 describes an ionic conductor comprising a porous organic body and an ionic liquid. The porous organic body is obtained by molding from a silica template.

Patent application EP 1 515 346 describes a microporous polymeric membrane having pores which penetrate across the opposite sides of said membrane, which may optionally contain a molten salt.

There continues, therefore, to be a need for a membrane comprising PCILs that possesses both good proton conduction properties and good mechanical properties at temperatures greater than 100° C.

It has been found that this need can be met by a macroporous membrane produced from a polyimide-based material having a particular porosity.

The production of polyimide membranes has already been described for other applications, as for example in U.S. Pat. No. 4,963,303 and in patent application CN 101 665 580. However, the production methods described in these documents are different from that of the present invention, and none proposes impregnating the resultant membrane with PCIL.

SUMMARY OF THE INVENTION

The present invention accordingly provides a membrane comprising a porous, polymeric, polyimide-based material having interconnected macropores which is impregnated with PCIL, and a method for its production, and uses thereof.

BRIEF DESCRIPTION OF THE FIGURES

FIG. 1A represents the face of this film exposed to the humid atmosphere; FIG. 1B represents the face of this film against the glass; FIG. 1C represents a cross section through this film.

FIG. 2A represents the face of this film exposed to the humid atmosphere; FIG. 2B represents the face of this film against the glass; FIG. 2C represents a cross section through this film.

DETAILED DESCRIPTION

Figure 1:
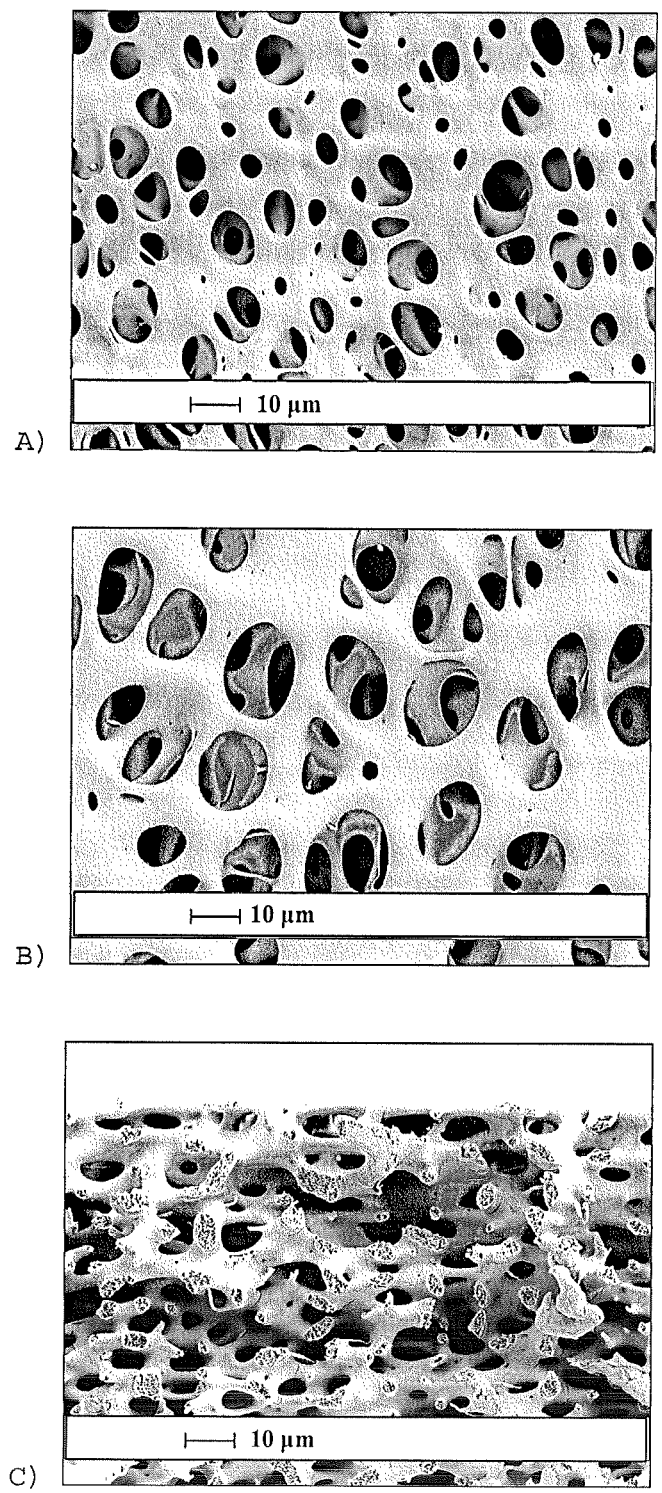
FIGS. 1A, 1B, and 1C represent the images produced by scanning electron microscopy of a porous film produced from Matrimid® and PVP.

In the text below, the expression "between . . . and . . . " should be understood as including the stated end points.

The membrane according to the present invention comprises a porous, polymeric, polyimide-based material. In the sense of the present invention, a polyimide-based polymer denotes a polymer in which the monomers include at least one unit I below:

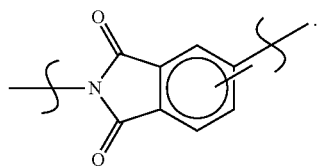
(I)

The polyimide-based polymer of the present invention is preferably a homopolymer. It may also be a copolymer; in that case, only some of the monomers include at least the unit (I) above.

The polyimide-based polymer according to the present invention may comprise one or more chemical functions other than the imide function—for example, one or more ketone, ether, amine, amide, nitro, sulfoxide, sulfone and/or halogen functions.

The polyimide-based polymer of the present invention is preferably not a polyetherimide.

It is preferable, furthermore, for the polyimide-based polymer according to the present invention to be selected from the group consisting of the homopolymer composed of the unit A:

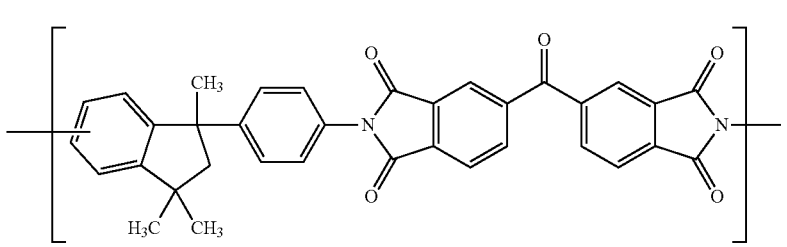
A and of the homopolymer composed of the unit B:

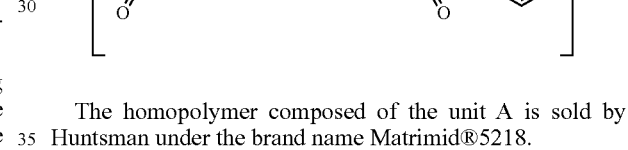
B

The homopolymer composed of the unit A is sold by Huntsman under the brand name Matrimid®5218.

The homopolymer composed of the unit B is a fluorinated polyimide known under the name 6FDA-mPDA. Its synthesis is described in the literature. A protocol is available, for example, in the following publications:

1) Synthesis of fluorinated polyimides, by Shigekuni Sasaki and Shiro Nishi, in "Polyimides: fundamental and applications", Malay K. Gosh, K. L. Mittal Eds., Marcel Dekker Inc. N.Y., Chapt 4, pp 71-119 (1996).

2) Fluorinated high-performance polymers: Poly(arylene ether)s and aromatic polyimides containing trifluoromethyl groups, Mahua G. Dhara, Susanta Banerjee, Progress in *Polymer Science*, 35 (2010) 1022-1077.

The polyimide-based polymer preferably makes up between 25% and 35% by weight of the impregnated membrane according to the invention. This percentage varies in particular in dependence on the density of the polymer. Accordingly, when the polyimide-based polymer is the polymer of formula A, it constitutes preferably between 25% and 31%, more preferably between 27% and 29%, by weight of the impregnated membrane according to the invention. When the polyimide-based polymer is the polymer of formula B, it constitutes preferably between 30% and 35%, more preferably between 32% and 33%, by weight of the impregnated membrane according to the invention.

The porous, polymeric material of the membrane according to the present invention has a particular porosity: specifically, it contains interconnected macropores.

The porosity of the polymeric material may be observed by SEM (scanning electron microscope) imaging. The skilled person is able to measure the size of the pores in a membrane from an image, obtained by SEM, of a section through the membrane, by measuring the greatest dimension of each observable pore and by forming an average from these measurements. In the sense of the present invention, the expression "average size" of the pores therefore denotes the average of the greatest dimension of the pores.

In accordance with the IUPAC recommendations, macropores denote pores with a diameter of greater than 50 nm (nanometers). In the sense of the present invention, the macropores are pores which have an average size of greater than 50 nm.

The interconnected macropores of the polymeric material according to the invention preferably have an average size of between 3 and 20 μm (micrometers), preferably between 5 and 15 μm. More preferably, the interconnected macropores of the polymeric material according to the invention have an average size of between 5 and 9 μm, and more preferably still between 5 and 8 μm.

Furthermore, the polymeric material according to the present invention may have secondary macropores, smaller than the above-described interconnected macropores, with an average size of between 0.2 and 3 μm (micrometers), preferably between 0.4 and 2 μm, more preferably still between 0.5 and 1 μm. According to this embodiment, these secondary macropores form a second population of pores, and the polymeric material has a bimodal porosity.

Interconnected pores denote pores which are open to one another and which, taken collectively, form a continuous circuit through the polymeric material. The interconnectivity of the pores in the membrane may be evaluated by a measurement of the gas permeability of said membrane. The permeability of a porous medium corresponds to its capacity to be traversed by a fluid (liquid or gas) under the effect of a pressure gradient. Experimentally, it is possible to measure the flow rate of gas leaving the membrane as a function of the gas pressure which is applied at its entry. The permeability κ is expressed generally in square meters (m$^2$) or in darcys (1 darcy=0.98 10$^{-12}$ m$^2$):

$$\kappa = \frac{Q \times \eta}{S} \times \frac{\Delta x}{\Delta P}$$

where Q represents the flow rate of gas leaving the membrane, in m$^3 \cdot$s$^{-1}$, η represents the dynamic viscosity of the fluid, in Pa·s, S represents the sectional area of the test specimen in which the test is performed, in m$^2$, and ΔP/Δx represents the pressure gradient, measured in Pa·m$^{-1}$.

According to the present invention, the nitrogen permeability of said membrane is greater than or equal to 10$^{-10}$ m$^2$, preferably greater than or equal to 10$^{-9}$ m$^2$.

The impregnated membrane according to the invention is preferably symmetrical, meaning that the two faces of the membrane have a similar morphology. For certain applications, the symmetry of the membrane may be an advantage. In particular, the membrane may be reversible.

The impregnated membrane according to the present invention preferably has a thickness of between 40 μm and 120 μm, more preferably between 50 μm and 100 μm.

The porous, polymeric material according to the invention is impregnated with a proton-conducting ionic liquid. The membrane therefore comprises at least one proton-conducting ionic liquid. Proton-conducting ionic liquids (or PCILs) are ionic liquids which are able to take on the role of proton conductors. PCILs are salts and are therefore composed of an anion and a cation.

The anion may preferably be selected from the group consisting of sulfonates, more particularly alkylsulfonates such as methylsulfonate (MS), halogenated alkylsulfonates such as trifluoromethylsulfonate (TF), perfluorobutanesulfonate (PFBu), perfluorooctanesulfonate (PFOc), and benzenesulfonates such as pentafluoro-benzenesulfonate (PF), trifluoromethylbenzenesulfonate (TFBSu), benzenesulfonate (BS), acetates, more particularly trifluoroacetate (TFA) and acetate (AA), benzoate (BA), and a perfluorosulfonimide of general formula [(R$_F$—SO$_2$)N(R$_F$'—SO$_2$)]$^-$ in which R$_F$ and R$_F$' are perfluoroalkenylene radicals of type C$_n$F$_{2n+1}$ which may be identical or different, with one of them being selected preferably with n=1 if they are different.

Preferably, the cation may be an ammonium, and the corresponding amine may be selected from the group consisting of alkyl amines, optionally alkoxylated, guanidines, and cyclic amines, which are substituted or unsubstituted, such as pyrrolidines, piperidines, morpholines, imidazoles, and sparteines. In particular, the cation is an ammonium for which the corresponding amine may be selected from the group consisting of triethylamine (TEA), trimethylamine (TMEA), tripropyl-amine (TPrA), dipropylamine (DPrA), bis-methoxyethylamine (BMEA), ethylamine (EA), diethylamine (DEA), dibutylamine (DBuA), pyrrolidine (Py), butylpyrrolidine (BuPy), ethyl-pyrrolidine (EtPy), piperidine (Pip), methylpiperidine (MetPip), ethylpiperidine (EtPip), sparteine (Spart), and ethylmorpholine (EtMph).

Furthermore, the cation may be a phosphonium, obtained by protonation of a phosphine, or a sulfonium, obtained by protonation of a sulfide. The cation may also be obtained by protonation of a carboxylic amide or of a sulfonamide.

The proton-conducting ionic liquid according to the invention may be composed of any combination of an anion selected from the group above with a cation selected from the groups above.

Very preferably the proton-conducting ionic liquid is selected from the group consisting of triethylammonium sulfonates and acetates, preferably TF-TEA, MS-TEA, TFA-TEA, PF-TEA, AA-TEA, PFBu-TEA, and PFOc-TEA. More preferably, the proton-conducting ionic liquid is selected from the group consisting of TF-TEA, MS-TEA, PFBu-TEA, PF-TEA, and TFA-TEA. More preferably still, the proton-conducting ionic liquid is selected from the group consisting of TF-TEA, MS-TEA, and PFBu-TEA.

The mass of proton-conducting ionic liquid preferably makes up between 65% and 75% of the mass of the impregnated membrane according to the invention. This percentage varies in particular in dependence on the density of the polymer. Accordingly, when the polyimide-based polymer is the polymer of formula A, the mass of proton-conducting ionic liquid makes up preferably between 69% and 75%, more preferably between 71% and 73%, of the mass of the impregnated membrane according to the invention. When the polyimide-based polymer is the polymer of formula B, the mass of proton-conducting ionic liquid makes up preferably between 65% and 70%, more preferably between 67% and 68%, of the mass of the impregnated membrane according to the invention.

The porous, polymeric material of the membrane according to the present invention may be manufactured according to any method known to the skilled person that allows a polymeric material to be produced with the specific porosity that has been described above.

In particular, the inventors have identified a mode of production that is particularly suited to the manufacture of such polymeric materials. The method in question is a vapor-induced phase separation (VIPS) method. This technique involves dissolving the polymer in a casting solvent. The polymer must therefore be soluble in this solvent, but insoluble in water. This solvent is evaporated in a humid atmosphere. The water which gradually takes the place of the solvent comes into contact with the polymer, which solidifies since it is insoluble in water.

The present invention further provides a method for producing the membrane according to the invention. Said method comprises the steps of:

a) preparing a solution comprising the polymer, at least one pore former, and at least one solvent, the polymer being present at a concentration of between 12.5% and 14.5% by weight of the solution;

b) spreading the mixture containing the dissolved polymer on a substrate to form a liquid coating;

c) subjecting this liquid coating to an atmosphere in which the relative humidity is between 45% and 55%, at a temperature between 20° C. and 30° C., for a time sufficient to cause the polymer to coagulate into a film;

d) rinsing the film obtained in step c) so as to remove the pore former and to produce macropores in the film;

e) impregnating said porous film with the proton-conducting ionic liquid, so as to obtain an impregnated membrane.

Step a) of the method according to the invention is that of preparing a solution comprising the polymer, at least one pore former, and at least one solvent. Dissolution may be realized by stirring and/or by heating. All conventional means known to the skilled person may be used so as to obtain a homogeneous solution. Step a) is preferably carried out in the absence of moisture, particularly with a dry solvent.

The pore former is a compound which leads to the formation of pores in the polymeric material. It is preferably a polymeric compound which is soluble in said solvent. The pore former according to the invention is preferably selected from a group consisting of polyethylene glycol, polyvinyl alcohol, polyvinyl acetate, polystyrene, polymethyl methacrylate, polyvinylpyrrolidone, and mixtures thereof. The pore former is preferably selected from polyvinylpyrrolidone and polyvinyl acetate. Very preferably the pore former is polyvinylpyrrolidone (PVP).

The solvent used in step a) of the method according to the invention is judiciously selected by the skilled person from the conventional solvents that are available and that allow solubilization of the polymer and of the pore former. This solvent may be selected from the group consisting of organic solvents, preferably dichloromethane, dichloroethane, chloroform, tetra-chloroethane, tetrahydrofuran, dioxane, acetophenone, cyclohexanone, m-cresol, γ(gamma)-butyrolactone, dimethylformamide, dimethylacetamine, and N-methylpyrrolidone. The solvent is preferably selected from dimethylformamide (DMF), dimethylacetamine (DMAC), and N-methylpyrrolidone. Very preferably the solvent is N-methylpyrrolidone (NMP).

The solution prepared in step a) of the method according to the invention may preferably comprise soluble additives. These additives may make it possible in particular to enhance the mechanical or thermal properties of the polymeric material, or to increase its proton conductivity.

The proportion of the various compounds in the solution may vary depending on the compounds selected. The pore former is preferably introduced at a concentration of between 6 and 8%, more preferably between 6.5 and 7.5% by weight, relative to the weight of the solution.

If soluble additives are present, they are preferably introduced at a concentration of between 1 and 5%, more preferably between 2 and 4% by weight relative to the weight of the solution.

According to one preferred embodiment of the present invention, the method according to the present invention may comprise a step a'), between step a) and step b), of suspending insoluble additives in the solution obtained at the end of step a). According to this embodiment, the additives may be an inorganic compound, preferably an inorganic compound from the class of clays, more particularly inorganic nanoparticles. The additives may optionally be functionalized by cold plasma treatment: said additives are activated by the plasma and react with reactants that are introduced into the plasma reactor and carry ionized or ionizable functions, preferably sulfonic-type functions.

The insoluble additives suspended in step a') of the method according to the invention are preferably nanoparticles of natural clays (for example, montmorillonite) or synthetic clays (for example, Laponite®), which are optionally functionalized by a plasma treatment, as are described in the article by P. Bébin, M. Caravanier, and H. Galiano "Nafion®/clay-$SO_3H$ membrane for proton exchange membrane fuel cell application", *Journal of Membrane Science* 278 (2006) 35-42. These nanoparticles may serve to scavenge the water produced at the cathode of the fuel cell irrespective of the operating temperature of the cell. This is because water may be detrimental to the PCILs.

According to this embodiment, the porous, polymeric, polyimide-based material having interconnected macropores that constitutes the membrane according to the present invention further comprises inorganic nanoparticles, preferably nanoparticles of natural clays (for example, montmorillonite) or synthetic clays (for example, Laponite®), which are optionally functionalized by a plasma treatment.

The insoluble additives suspended in step a') of the method according to the invention may also comprise silica nanoparticles.

If insoluble additives are present, they are preferably introduced at a concentration of between 1 and 5%, more preferably between 2 and 4% by weight, relative to the total weight of the suspension obtained in step a').

Step b) of the method according to the invention is that of spreading the mixture containing the dissolved polymer over a substrate to form a liquid coating. The mixture, which may be a solution obtained at the end of step a) or a suspension obtained at the end of step a'), is preferably cast onto a substrate and then spread by means, for example, of a doctor blade. The selection of the applicator is linked primarily to the thickness of the desired layer and to the viscosity of the mixture, which changes depending on the nature and concentration of the various constituents. The substrate used is preferably flat, smooth, and inert. It may, for example, be a substrate made of glass, Pyrex®, Mylar® or Teflon®. The coated layer has a thickness which is preferably between 100 and 400 µm (micrometers), more preferably between 200 and 300 µm. The skilled person knows how to adjust the thickness of the coated layer in step b) in dependence on the desired final thickness of the membrane.

Step c) of the method according to the invention is that of subjecting the mixture spread over a substrate, obtained in step b), to an atmosphere having a relative humidity (HR) of between 45% and 55%, preferably between 48% and 52%, at a temperature of between 20° C. and 30° C., preferably between 22° C. and 28° C., for a time sufficient to cause the polymer to coagulate, as for example of between 4 and 8 hours, preferably between 5 and 7 hours. The mixture spread over the substrate is preferably placed in a closed chamber at controlled temperature and controlled humidity. The atmosphere is composed preferably of nitrogen and water. Since the polyimide-based polymer is not soluble in water, the phenomenon of vapor-induced phase separation occurs, and the polymer coagulates into a film.

Step d) of the method according to the invention is that of rinsing the film obtained in step c) so as to remove the pore former. Rinsing is carried out in a solution containing a compound which is both a solvent for the pore former and a nonsolvent for the polymer. More particularly, when the pore former is polyvinylpyrrolidone, rinsing may be carried out with water, more particularly demineralized water, with an alcohol, as for example ethanol, or with a water/alcohol mixture, more particularly a water/ethanol mixture. Rinsing may take place, for example, by immersion of the film obtained in step c) and its substrate into the rinsing solution. In the course of rinsing, the film may be separated from the substrate. This step d), by removal of the pore former, allows the formation of macropores in the film.

The film may optionally be subjected to treatments which allow its mechanical properties to be reinforced.

The rinsed polymeric material is preferably then dried according to the techniques known to the skilled person, preferably according to nonaggressive techniques for maintaining the pores in the polymeric material. The polymeric material is preferably dried first in the ambient air and then under vacuum in a desiccator.

Furthermore, the method according to the present invention may include a step d'), between step d) above and step e) below, of functionalizing the surface of the film obtained in step d) by cold plasma treatment. A plasma is a partially ionized gas which contains charged species, ions (primarily positive) and electrons, but also neutral species (atoms or molecules) which are in excited or metastable form, thereby making the plasma a highly reactive medium. Treatment by cold plasma is an advantageous technique. It is a clean and dry technique which produces no effluents. It alters only the extreme surface of the treated material (over a thickness of a few nanometers) without affecting the core properties of the material, thereby making it possible to retain intact the service properties of said material. However, the size of the pores in the film according to the present invention may allow the ionized gas to reach the wall of pores deep down in the film. The cold plasma treatment should therefore allow the surface of the pores themselves to be treated. Lastly, this technique is able to use chemical species which are inert in the natural state and which become reactive only when excited and ionized in the plasma phase. This type of treatment, moreover, is rapid and the development of vacuum material techniques is making it henceforth applicable to industrial processes.

The cold plasma treatment in the method according to the present invention allows the polarity of the surface of the film obtained at the end of step d) to be modified. This fictionalization promotes compatibility of the polymeric film with the ionic liquid subsequently applied.

Typically it is possible to use a radiofrequency plasma reactor. Other types of plasma reactors can be used, such as microwave plasma or corona plasma. The operating conditions (treatment time, power, flow rate, position of the sample in the reactor, treatment cycles, etc.) will be selected by the skilled person in accordance with the anticipated results. In certain cases, prior treatment of the surface must be carried out by a plasma treatment using argon and/or helium gases.

According to a first embodiment of the present invention, the cold plasma treatment is applied to the film obtained at the end of step d) in order to make its surface more hydrophobic. The gas used is preferably a fluorinated gas such as $CF_4$. For treatment with $CF_4$, the operating conditions may be as follows: the treatment may last preferably between 25 and 35 seconds, at a power of between 30 and 50 W, with a gas flow rate of between 30 and 50 standard cubic centimeters per minute (sccm). Other gases may be used, such as TMS (trimethylsilane), HDMSO (hexamethyldisiloxane), and also gas mixtures ($CF_4+H_2$, $CF_4+C_2H_2$, etc.).

According to a second embodiment of the present invention, the cold plasma treatment is applied to the film obtained at the end of the step d) in order to make its surface more hydrophilic. The gas used is preferably dioxygen $O_2$ or dinitrogen $N_2$. For treatment with $O_2$ or $N_2$, the operating conditions may be as follows: the treatment may last preferably between 100 and 200 seconds, at a power of between 60 and 90 W, with a gas flow rate of between 5 and 20 sccm. Other oxygen-containing gases may also be used, such as $CO_2$ (carbon dioxide), and also gas mixtures ($O_2/N_2$, $O_2/CO_2$, etc.).

Moreover, the method according to the present invention may comprise a step d"), between step d) and e), of functionalizing the pores by means of ionic groups, in particular by a sulfonation treatment. For example, it is possible to carry out treatments of the porous, polymeric material with concentrated $H_2SO_4$, with an $SO_3/N_2$ mixture, with $ClSO_3H$, with a $Cl_2/SO_2$ mixture in the presence of sodium hydroxide, or with an $SO_2/O_2$ mixture. Such treatments are described, for example, in the publication "Sulfonation of polymer surface I. Improving adhesion of polypropylene and polystyrene to epoxy adhesive via gas phase sulfonation", B. L. Erikson, H. Asthana, L. T. Drzal., *Journal of Adhesion Science and Technology*, 11(10) (1997) 1249-1267.

This step may be implemented in addition to step d') above, between steps d) and d') or between steps d') and e).

Lastly, step e) of the method according to the present invention is that of impregnating the porous film obtained before with a proton-conducting ionic liquid, so as to give an impregnated membrane. The PCIL is preferably selected from those described above.

The preparation of these PCILs is described, for example, in the publication "Ion transport in CLIP: Investigation through conductivity and NMR measurements", C. Iojoiu, P. Judeinstein, and J.-Y. Sanchez, *Electrochimica acta* 53 (2007) 1395-1403.

The impregnation of the porous film with a proton-conducting ionic liquid may be carried out by conventional techniques known to the skilled person. The porous film may preferably be immersed in the proton-conducting ionic liquid.

It is likewise possible to impregnate the porous film with the proton-conducting ionic liquid by applying the proton-conducting ionic liquid, pure or in solution, to the surface of the membrane by means of a syringe, while maintaining the other face of the membrane under reduced pressure.

The porous film may also be impregnated by spraying.

The method according to the invention enables the manufacture of membranes which possess the technical features of the membranes according to the invention, namely membranes comprising a porous, polymeric, polyimide-based material having interconnected macropores which is impregnated with proton-conducting ionic liquid. The present invention accordingly further provides the membranes according to the invention which are obtainable by the method as defined in the present specification.

The membranes that are subject-matter of the invention meet the need for availability of membranes comprising PCILs that possess both good proton conduction properties and good physical properties, more particularly a high thermal and mechanical stability, and which have a wide field of electrochemical stability.

The membranes according to the present invention, indeed, possess much higher mechanical strength than the comparable membranes of the prior art, and, more particularly, than the membranes based on Nafion®. The mechanical strength of the membrane may be estimated by measurement of its Young's modulus as a function of temperature. The membranes according to the invention preferably have a Young's modulus at 120° C. of more than 10 MPa, preferably more than 50 MPa, more preferably more than 100 MPa. The mechanical strength of the membranes according to the invention is greater than that of comparable Nafion® membranes, whose Young's modulus is less than 4 MPa.

The membranes according to the present invention, moreover, are stable to high temperature. The membranes according to the invention are preferably stable up to 200° C., more preferably up to 300° C., and more preferably still up to 400° C. The thermal stability may be measured experimentally by thermogravimetric analysis.

Lastly, the membranes according to the invention retain their very good mechanical strength at high temperature. The Young's modulus of the membranes at 250° C. is preferably more than 10 MPa, preferably more than 50 MPa, more preferably more than 100 MPa. It is therefore possible to use these membranes for applications up to a temperature of 250° C.

Furthermore, in addition to their excellent mechanical strength, the membranes according to the invention have good proton conduction properties by virtue of their particular structure, with interconnected macropores. The proton conductivity may be measured experimentally as a function of temperature, by means, for example, of an electrochemical impedance spectroscopy instrument. To evaluate the performance of the membrane, it is necessary to compare, at a given temperature, the measured proton conductivity of a PCIL alone with the measured proton conductivity of the membrane impregnated with the same PCIL. The ratio (proton conductivity of the membrane according to the invention)/(proton conductivity of the PCIL alone) at 100° C. is preferably greater than or equal to 30%, preferentially greater than or equal to 40%, more preferably still greater than 50%. These ratios are higher than those of the comparable membranes described in the prior art. Accordingly, for a given PCIL, the conductivity of the membrane according to the invention at 100° C. is better than the conductivity of the membranes of the prior art. By virtue of the present invention it is possible to obtain, with the best PCILs, membranes having conductivities in the anhydrous state and at 130° C. which are close to the conductivity maxima of the Nafion® membranes at 80° C. and at 98% relative humidity.

Owing to their very good proton conduction and mechanical strength properties, the membranes according to the invention may be used as the proton exchange membranes in a proton exchange membrane fuel cell (PEMFC). The present invention further provides a proton exchange membrane fuel cell which comprises the membrane according to the present invention as electrolyte membrane. Said cell is advantageously intended for operation at a temperature of between 100° C. and 160° C., preferably between 120° C. and 140° C.

The macroporous, polymeric materials according to the invention may be used advantageously to reinforce the mechanical strength of the ionomers which can be used in PEMFC and DMFC applications operating at a temperature≤80° C., in other words under nonanhydrous conditions. In this case, consideration may be given to filling the porosity with Nafion® solutions as in the GORE membranes which use a PTFE (polytetrafluoroethylene) fabric. The porosity may alternatively be filled with mixtures of ionic monomer and neutral monomer, polymerized by a photochemical or thermal radical route.

The macroporous, polymeric materials according to the invention, furthermore, may also be used as a separator in a lithium-ion battery or a supercapacitor. In lithium-ion batteries, the porosity may be filled with liquid electrolyte solutions such as molar solutions of $LiPF_6$ in a mixture of carbonates, ethylene carbonate (EC) and dimethyl carbonate (DMC), in a 1/1 volume ratio.

The porosity may alternatively be filled by a solution of $LiPF_6$ with a molar concentration of between 0.4 and 0.7 M in an ionic liquid based on butylpyrrolidinium.

In the case of separators for supercapacitors, the porosity will be filled with a molar solution of tetraethylammonium tetrafluoroborate $(C_2H_5)_4N.BF_4$ in acetonitrile.

The present invention will be comprehended more effectively in light of the following example, which is given purely by way of illustration and not of limitation.

EXAMPLE

1. Materials

N-Methylpyrrolidone (NMP, boiling point: 197° C.) comes from Acros-Organics.

Polyvinylpyrrolidone (PVP, ref.: 81440, K 90, molar mass~360 000) comes from Fluka.

"Matrimid®" polyimide, grade 5218, Tg=323° C., was supplied by Huntsman $C^{ie}$, and the fluorinated polyimide 6FDA-mPDA, Tg=304° C., was synthesized by Laboratoire LMOPS-UMR 5041, Vernaison, France.

2. Production of the Membranes of the Invention a) Manufacture of Porous Films by the VIPS Process:

The porous films were prepared by the VIPS process, using water vapor as nonsolvent.

The polymer (14% by weight) was dissolved in NMP with polyvinylpyrrolidone (7% by weight), and the mixture was then heated to 70° C. and stirred for around 6 hours in a closed flask until a homogeneous mixture was obtained. The viscous solution obtained was coated in the form of a layer (thickness~300 μm) by means of a doctor onto a glass plate, then subjected for 6 hours to a stream of moist nitrogen in a glove box (controlled relative humidity HR=50%, temperature=25° C.)

Following coagulation of the polymer, the film (thickness~100 μm) was separated from the substrate in pure water, then rinsed carefully in a water/ethanol mixture (50/50 by volume). The porous film was dried in the ambient air, then stored in a desiccator under vacuum.

b) Preparation of the PCILs:

The PCILs were synthesized according to the protocols described in the following publications:

M. Martinez, Y. Molmeret, L. Cointeaux, C. Iojoiu, J-C. Leprêtre, N. El Kissi, P. Judeintein, and J-Y. Sanchez, "Proton-conducting ionic liquid-based PEMFC membranes: the key role of ionomer-ionic liquid interactions", J. Power Science, DOI: 10.1016/jpowsour.2010.01.036.

J. Y. Sanchez, C. Iojoiu, J. C. Leprêtre, M. Hanna, L. Cointeaux, Y. Molmeret, N. El Kissi, P. Judeinstein, D. Langevin, and R. Mercier, "Towards high temperature PEMFC Membranes Based on PCILS hosted by functional polymers", *Am. Chem. Soc., Div. Fuel Chem.*, 2010, 55(1).

The PCILs were obtained by acid-base titration in water or organic solvents of an amine with an organic acid, the two having been purified beforehand by distillation. Their purity was checked by NMR.

c) Production of the Membranes:

The membranes were produced by immersing the films in the selected PCIL overnight, after which the membranes were drip-dried and wiped gently to remove the excess liquid.

3. Methods of Characterization

Morphology of the Film:

The morphology of the film was studied by scanning electron microscopy (SEM JEOL JSM 35CF). The two faces of the film and its cross section were observed. With regard to observation of the cross section, the film was frozen in liquid nitrogen and subsequently fractured. Prior to examination, the samples were covered with a fine conductive layer of gold.

Porosity of the Film:

The porosity of the films was calculated by weighing samples of dense films and of porous films with known volumes.

Interconnectivity of the Pores in the Film:

To test the interconnectivity of the pores and the availability of conductive pathways within the film, a measurement was made of the gas permeability of the films:

A slight pressure difference was applied by a pressure regulator on either side of the film. The resulting gas flow was measured by an electronic flow meter. The flow rate/pressure curve recorded allows comparison of the various films.

Thermal Stability of the Film:

The thermal stability of the films was studied at between 25 and 800° C. by means of a Netzsch TG 209 instrument, with an oxygen stream of 12 ml/min and with a heating rate of 10° C./min.

Conductivity of the Membranes:

The conductivity of the membranes was determined by electrochemical impedance spectroscopy, using an HP 4192A impedance analyzer in the frequency range from 5 Hz to 13 MHz.

The membrane was placed between two stainless steel electrodes under argon in a Swagelok® cell equipped with Teflon® joints and spacers.

A special conductive cell made of platinum electrodes was filled with the PCIL. The cell constant of approximately 1 $cm^{-1}$ was determined by using a standard aqueous KCl solution.

The conductivity measurements were carried out at between 20° C. and 150° C. The temperature was equilibrated for approximately 2 hours before each measurement.

Mechanical Properties of the Membranes:

The dynamic mechanical analysis (DMA) measurements were made with a TA Instruments DMA Q800 spectrometer operating in traction mode. The amplitude of the stress was set at 0.01%. The tests were conducted in the viscoelastic range. The measurements of storage modulus were carried out under isochronic conditions (1 Hz) and the temperature was varied between −100° C. to +150° C. at a rate of 2° C./min.

4. Results

Two films were prepared according to the process described above:

"Mat 14 PVP 7": porous film produced from Matrimid® (14% by weight of the solution) and PVP (7% by weight of the solution);

"PIF 14 PVP 7": porous film produced from 6FDA-mPDA (14% by weight of the solution) and PVP (7% by weight of the solution).

Figure 2:
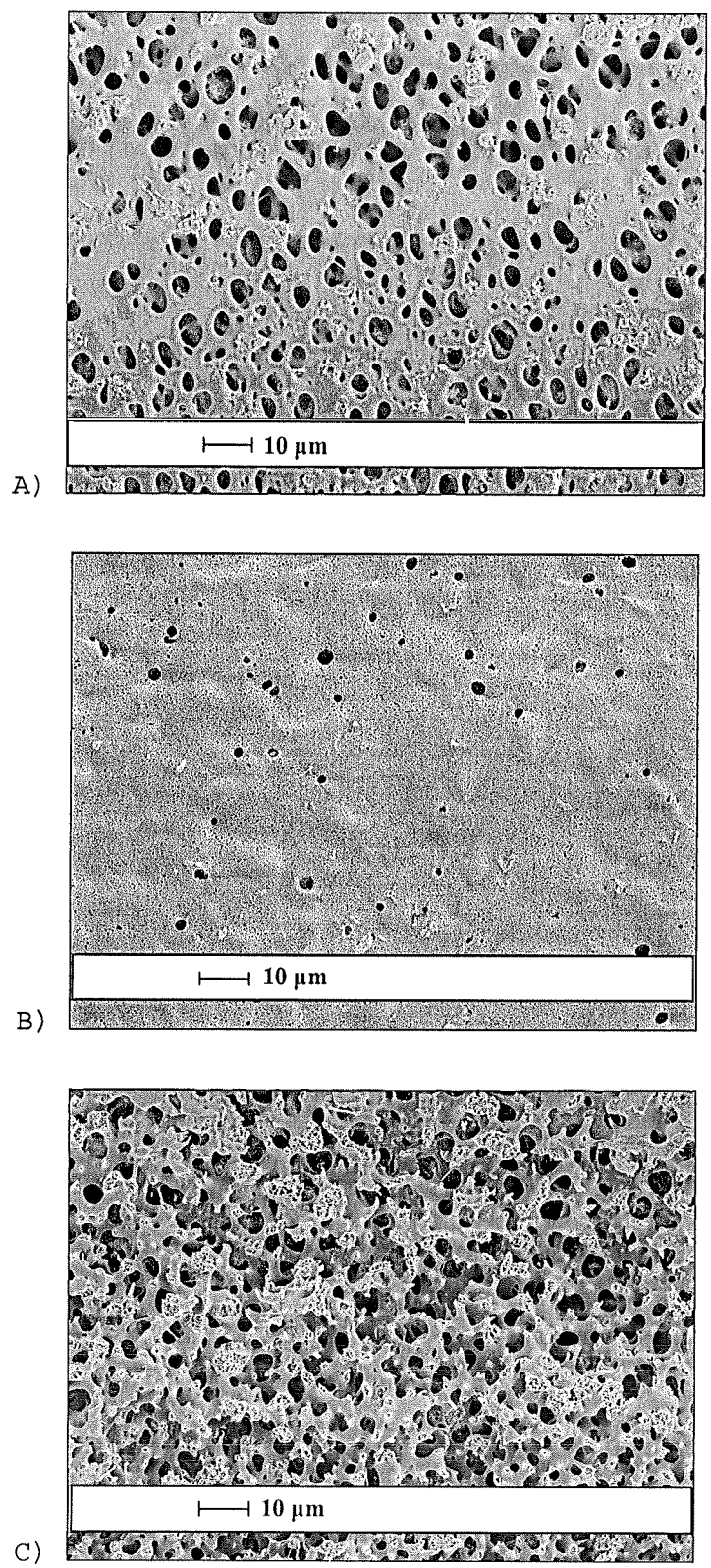
FIGS. 2A, 2B, and 2C represent the images produced by scanning electron microscopy of a porous film produced from 6FDA-mPDA and PVP.

The morphology of these two films was observed by scanning electron microscopy (FIG. 1: "Mat 14 PVP 7" and FIG. 2: "PIF 14 PVP 7"). These two films are observed to have a porous structure with interconnected pores. The images of the cross section of these two films (FIGS. 1C and 2C) are fairly similar, although the "Mat 14 PVP 7" film has wide pores (average size of approximately 10 µm) which are larger than those present in the "PIF 14 PVP 7" film (average size of approximately 5 µm).

At higher magnification it is possible to make out secondary macropores in the walls of the aforementioned macropores. These secondary macropores have an average size of approximately 0.5 µm.

Comparing FIGS. 1A and 1B, the "Mat 14 PVP 7" film is observed to have good symmetry. This is not the case, on the other hand, for the "PIF 14 PVP 7" film (cf. FIGS. 2A and 2B).

The porosity of the films according to the invention and of comparative films was measured (table 1).

Films 1 and 4 are, respectively, dense and pore-free films of Matrimid and of 6FDA-mPDA obtained by evaporation of the solvent (NMP) at approximately 200° C. in a vacuum oven. They were used as a reference for calculating the density and the porosity of the porous films.

Film 2: "Mat 14": film produced from Matrimid® (14% by weight of the solution) without PVP.

Film 3: "Mat 14 PVP 7"

Film 5: "PIF 15": film produced from 6FDA-mPDA (15% by weight of the solution) without PVP.

Film 6: "PIF 14 PVP 7"

TABLE 1

Porosity of the films

| | Film | | | | | |
|---|---|---|---|---|---|---|
| | 1 | 2 | 3 | 4 | 5 | 6 |
| Structure | Dense | Porous | Porous | Dense | Porous | Porous |
| Density ($g/cm^3$) | 1.2 | 0.3 | 0.4 | 1.5 | 0.4 | 0.4 |
| Porosity (% by vol.) | 0 | 77 | 72 | 0 | 74 | 72 |

"Mat 14 PVP 7" and "PIF 14 PVP 7" have an equivalent pore volume of approximately 72%.

Figure 3:
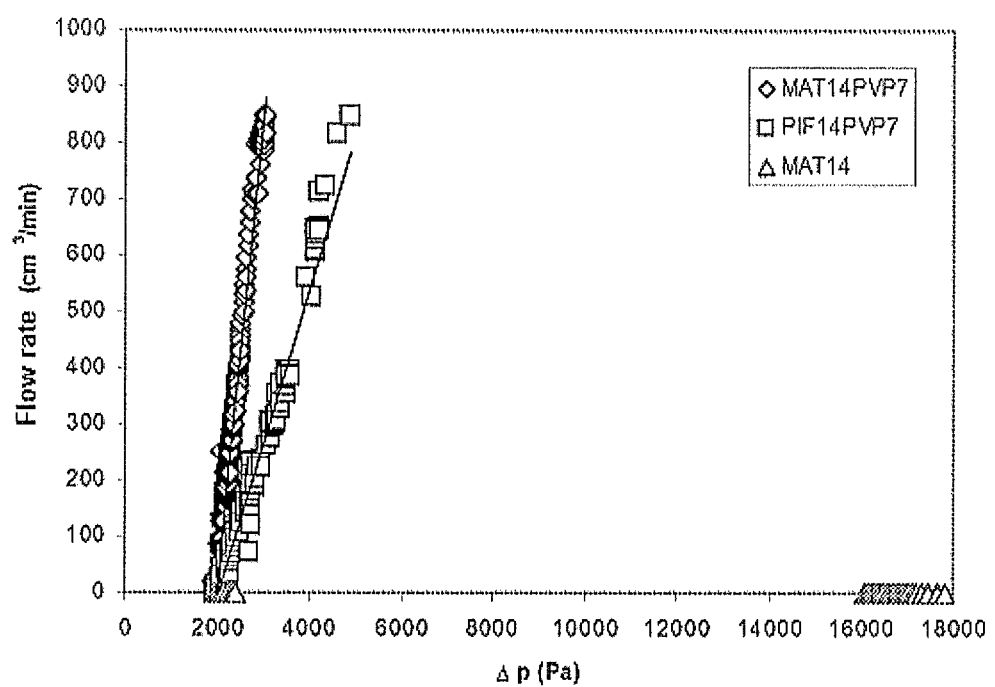
FIG. 3 shows the flow rate/pressure curve measured for a stream of nitrogen crossing different films.

The interconnectivity of the pores was evaluated by a nitrogen permeation test whose results are presented in FIG. 3. From this figure it is possible to deduce the values for the nitrogen permeability κ of the membranes (table 2).

TABLE 2

Nitrogen permeability of the films

| | Film | | |
|---|---|---|---|
| | 2 | 3 | 6 |
| k ($m^2$) | ≈0 | $7.6 \cdot 10^{-9}$ | $3.5 \cdot 10^{-9}$ |

Only the "Mat 14 PVP 7" and "PIF 14 PVP 7" films have interconnected pores.

Figure 4:
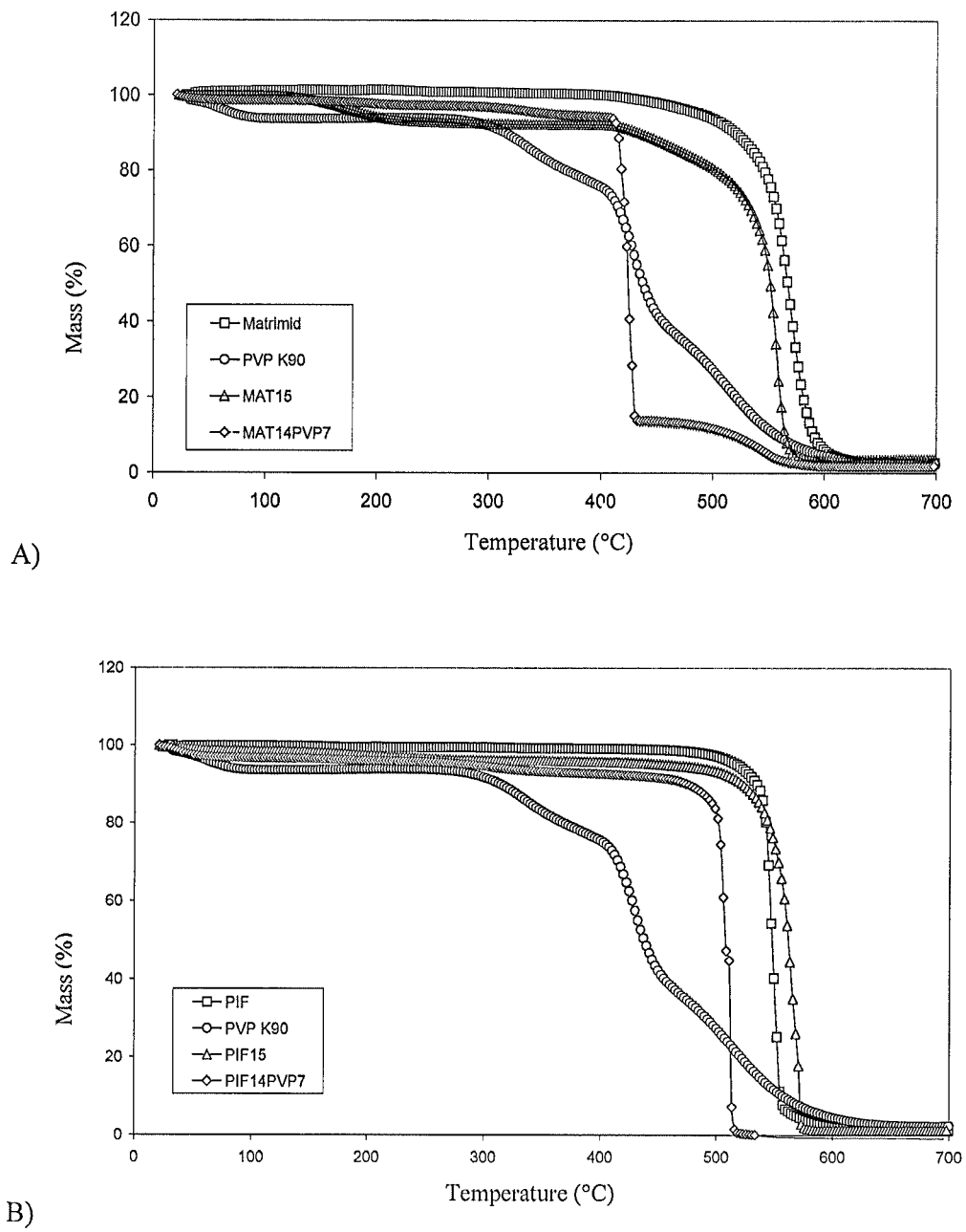
FIGS. 4A and 4B represent the results of thermogravimetric analysis of different compounds between 25 and 800° C.

The thermal stability of the "Mat 14 PVP 7" and "PIF 14 PVP 7" films was tested (cf. FIG. 4).

In FIG. 4A, "MAT14PVP7" denotes the porous film produced from Matrimid® (14% by weight of the solution) and PVP (7% by weight of the solution); "MAT15" denotes a film produced from Matrimid® (15% by weight of the solution); "Matrimid" denotes Matrimid® as a powder; and "PVP K90" denotes PVP as a powder.

In FIG. 4B, "PIF14PVP7" denotes the porous film produced from 6FDA-mPDA (14% by weight of the solution) and PVP (7% by weight of the solution); "PIF15" denotes a film produced from 6FDA-mPDA (15% by weight of the solution); "PIF" denotes 6FDA-mPDA as a powder; and "PVP K90" denotes PVP as a powder.

The thermal stability of the "Mat 14 PVP 7" and "PIF 14 PVP 7" films is satisfactory. They break down only at around 400° C.

Figure 5:
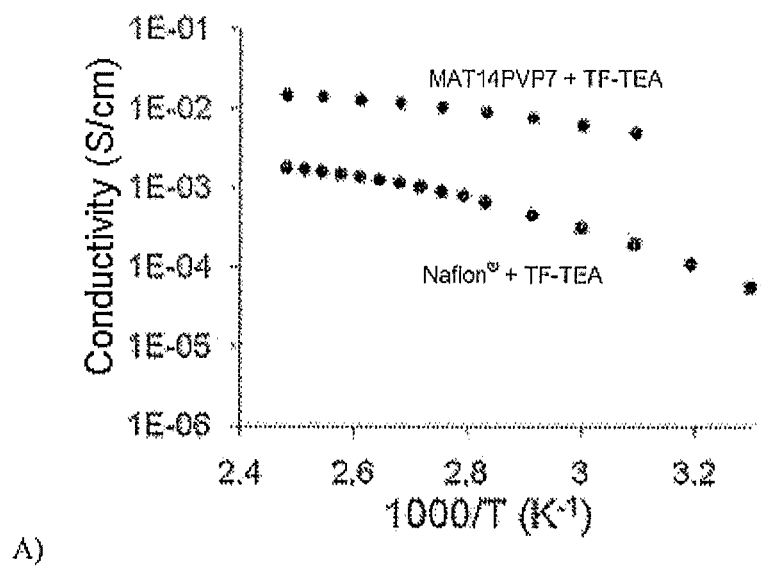
FIG. 5A shows the results of the conductivity measurement, and FIG. 5B the results of the mechanical strength measurement, for the membrane "MAT14PVP7", impregnated with PCIL TF-TEA, by comparison with a Nafion® membrane impregnated with this same PCIL.
Figure 5:
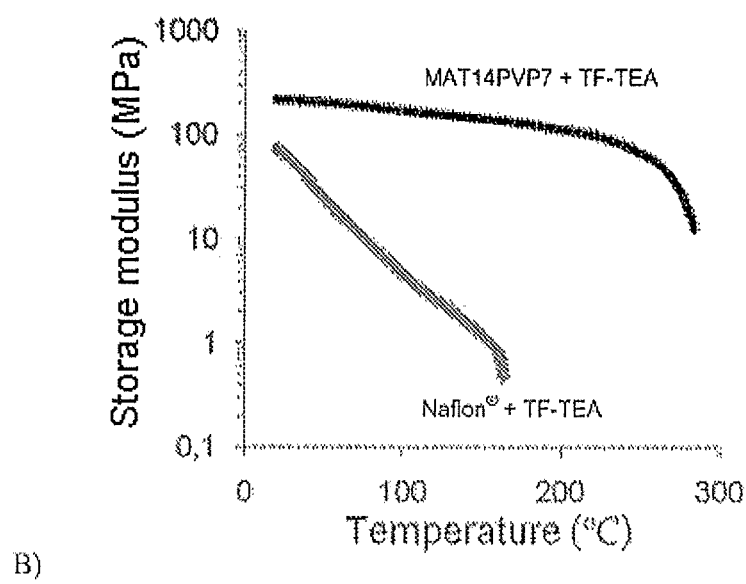

The "MAT 14 PVP 7" membrane impregnated with the PCIL TF-TEA has a conductivity (cf. FIG. 5A) and a mechanical storage modulus (cf. FIG. 5B) that are better than those measured on a Nafion® membrane impregnated with this same PCIL.

The "Mat 14" and "Mat 14 PVP 7" membranes were produced according to the protocol described above, and then dried in an oven at 75° C. for 24 hours. They were placed in a platinum boat in a nitrogen atmosphere and heated at a temperature ranging from 30° C. up to 700° C. (temperature ramp of 10° C./minute).

Figure 6:
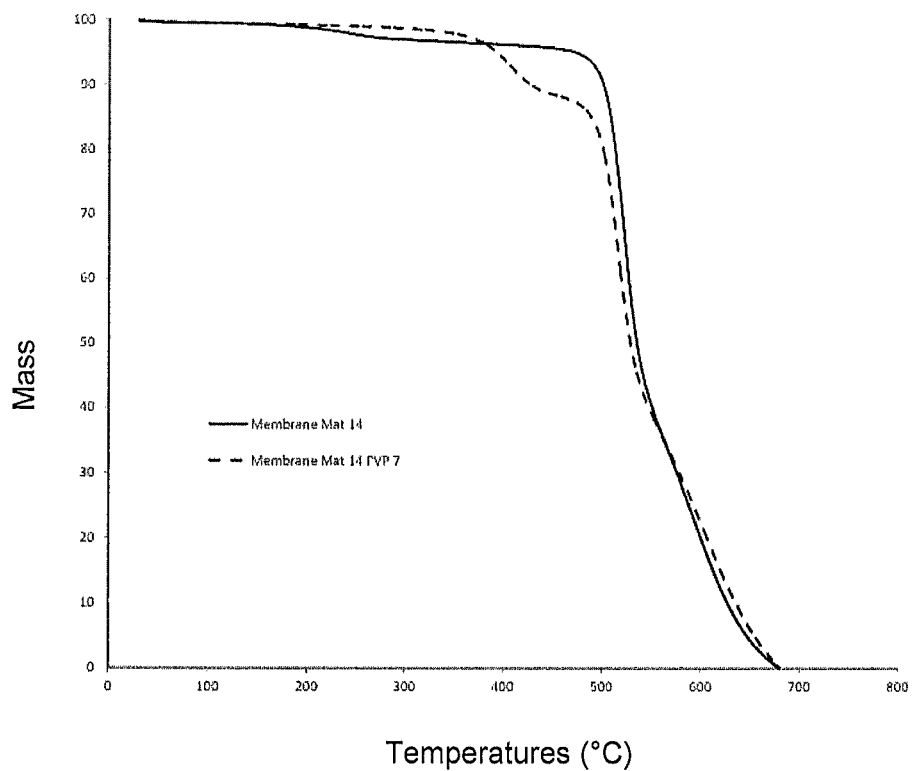
FIG. 6 shows, on the same thermogram, the mass of different samples as a function of the temperature.

The thermogram representing the mass of the two membranes ("Mat 14" as a solid line and "Mat 14 PVP 7" in dots) as a function of temperature is shown in FIG. 6.

The "Mat 14" membrane produced without pore former breaks down in two stages, first from 200° C. onward, then from 500° C. onward. The first breakdown corresponds to the departure of the NMP solvent, which has a boiling temperature of 202° C. The second breakdown corresponds to the breakdown of the polymer itself.

The "Mat 14 PVP 7" membrane produced with the pore former likewise exhibits breakdown in a number of stages. However, the breakdown at around 200° C. is not as visible as for the "Mat 14" membrane, which may be explained by the fact that the departure of the NMP solvent is less substantial and/or is delayed. The breakdown at around 400° C. corresponds to the breakdown of the PVP.

While not wishing to be tied by this theory, the inventors think that a residual part of NMP solvent and of PVP pore former is trapped in the secondary macroporosity of the membrane according to the invention.

Comparison of the Porous Membranes Before and after Impregnation with the PCIL

A sample of a "MAT 14 PVP 7" membrane according to the invention was divided into two: the first part was impregnated with PCIL according to the invention, the second not.

Figure 7:
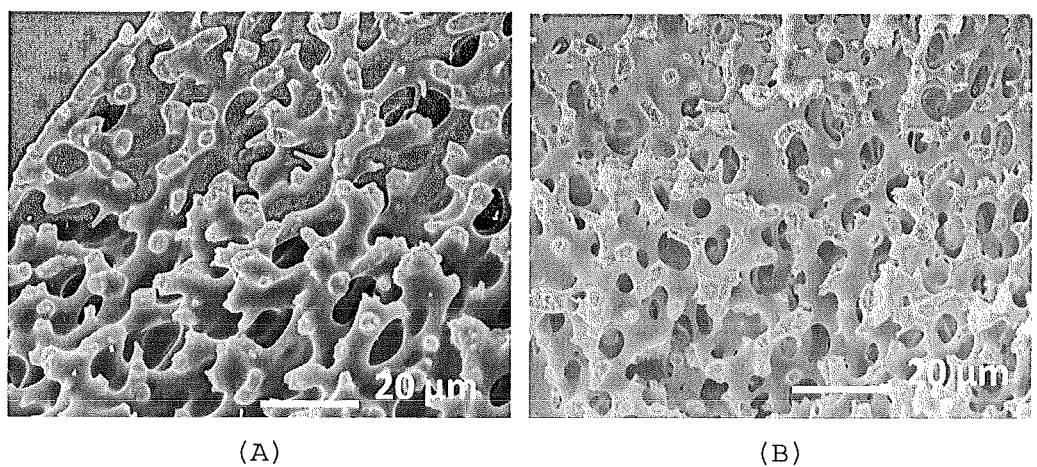
FIGS. 7A and 7B show the images produced by scanning electron microscopy of the porous film according to the invention, in one case impregnated with PCIL (7A) and in the other case unimpregnated (7B).

The two parts were metalized, placed under vacuum, and then observed by scanning electron microscopy (SEM JEOL JSM 35CF). The images recorded are shown in FIG. 7: FIG. 7A corresponds to the PCIL-impregnated sample, the corresponding FIG. 7B to the unimpregnated sample.

In FIG. 7B, it has been possible to observe the porous structure of the membrane: the dual porosity can be seen. In contrast, in FIG. 7A, the second, finer porosity cannot be seen. This may be explained with the fact that, despite the metalation treatment and vacuum treatment, the second population of smaller pores is filled with PCIL.

From this observation it can be concluded that the PCIL fills all of the porosity in the membrane according to the invention:

the PCIL fills the interconnected macropores of the membrane, which have an average size of between 3 and 20 µm, preferably between 5 and 15 µm;

the PCIL also fills the secondary macropores of the membrane, whose average size is between 0.2 and 3 µm, preferably between 0.4 and 2 µm, more preferably still between 0.5 and 1 µm.

The PCIL present in the secondary macropores was not removed by the metalation treatment and vacuum treatment prior to the microscopy. The secondary macroporosity of the membrane therefore plays a major part in keeping the PCIL at the core of the porous membrane.

The invention claimed is:

1. A membrane comprising a porous, polymeric, polyimide-based material having interconnected macropores which is impregnated with proton-conducting ionic liquid, wherein the interconnected macropores have an average size of between 3 and 20 µm and the polymeric material additionally has secondary macropores with an average size of between 0.2 and 3 µm, wherein the polyimide-based polymer is selected from the group consisting of the homopolymer composed of the unit A:

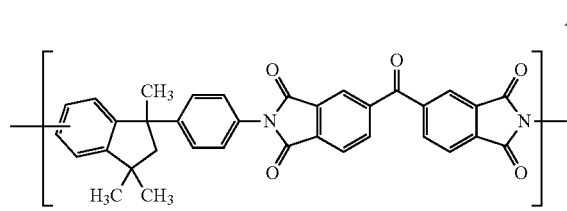

and of the homopolymer composed of the unit B:

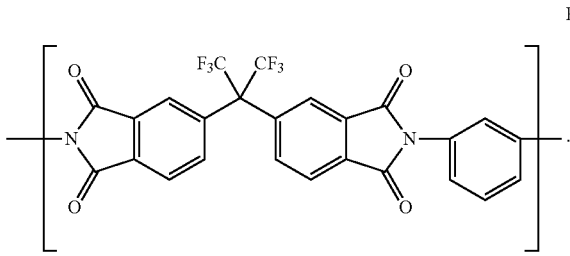

2. The membrane as claimed in claim 1, wherein the interconnected macropores have an average size of between 5 and 15 µm.

3. The membrane as claimed in claim 2, wherein the interconnected macropores have an average size of between 5 and 9 µm.

4. The membrane as claimed in claim 1, wherein the secondary macropores have an average size of between 0.4 and 2 µm.

5. The membrane as claimed in claim 4, wherein the secondary macropores have an average size of between 0.5 and 1 µm.

6. The membrane as claimed in claim 1, wherein the porous, polymeric material further comprises inorganic nanoparticles.

7. The membrane as claimed in claim 6, wherein the inorganic nanoparticles are clay nanoparticles which are natural or synthetic and are optionally functionalized by a plasma treatment.

8. The membrane as claimed in claim 1, wherein the proton-conducting ionic liquid is selected from the group consisting of TF-TEA, MS-TEA, TFA-TEA, PF-TEA, AA-TEA, PFBu-TEA, and PFOc-TEA.

9. The membrane as claimed in claim 8, wherein the proton-conducting ionic liquid is selected from the group consisting of TF-TEA, MS-TEA, PFBu-TEA, PF-TEA, and TFA-TEA.

10. The membrane as claimed in claim 9, wherein the proton-conducting ionic liquid is selected from the group consisting of TF-TEA, MS-TEA, and PFBu-TEA.

11. A method for producing the membrane as defined in claim 1, comprising the steps of:
   a) preparing a solution comprising the polymer, at least one pore former, and at least one solvent, the polymer being present at a concentration of between 12.5% and 14.5% by weight of the solution;
   b) spreading the mixture containing the dissolved polymer on a substrate to form a liquid coating;
   c) subjecting this liquid coating to an atmosphere in which the relative humidity is between 45% and 55%, at a temperature between 20° C. and 30° C., for a time sufficient to cause the polymer to coagulate into a film;
   d) rinsing the film obtained in step c) so as to remove the pore former and to produce macropores in the film; and
   e) impregnating said porous film with the proton-conducting ionic liquid, so as to obtain an impregnated membrane.

12. The method as claimed in claim 11, wherein the pore former is selected from the group consisting of polyethylene glycol, polyvinyl alcohol, polyvinyl acetate, polystyrene, polymethyl methacrylate, polyvinylpyrrolidone, and mixtures thereof.

13. The method as claimed in claim 12, wherein the pore former is selected from the group consisting of polyvinylpyrrolidone and polyvinyl acetate.

14. The method as claimed in claim 13, wherein the pore former is polyvinylpyrrolidone (PVP).

15. The method as claimed in claim 11, wherein it comprises a step d'), between step d) and step e), of functionalizing the surface of the film obtained in step d) by cold plasma treatment.

16. The method as claimed in claim 11, wherein it further comprises a step d"), between step d) and step e), of functionalizing the pores using ionic groups.

17. The method as claimed in claim 16, wherein step d") is a sulfonation treatment.

18. A proton exchange membrane fuel cell comprising the membrane as defined in claim 1 as electrolytic membrane.

* * * * *